United States Patent
Reiter et al.

(10) Patent No.: US 7,263,834 B2
(45) Date of Patent: Sep. 4, 2007

(54) METHOD FOR COOLING A GAS TURBINE SYSTEM AND A GAS TURBINE SYSTEM FOR PERFORMING THIS METHOD

(75) Inventors: Wilhelm Reiter, Kussaberg (DE); Hans Wettstein, Fislisbach (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 09/873,373

(22) Filed: Jun. 5, 2001

(65) Prior Publication Data

US 2004/0206064 A1    Oct. 21, 2004

(30) Foreign Application Priority Data

Jun. 5, 2000    (DE)    ................. 100 27 842

(51) Int. Cl.
*F02C 7/18*    (2006.01)
*F02C 7/12*    (2006.01)

(52) U.S. Cl. .................... 60/782; 60/806; 415/115

(58) Field of Classification Search .................. 60/782, 60/806; 415/115
See application file for complete search history.

(56) References Cited

U.S. PATENT DOCUMENTS

| | | | |
|---|---|---|---|
| 3,751,909 A | 8/1973 | Kohler | |
| 5,392,515 A | 2/1995 | Auxier et al. | |
| 5,498,133 A | 3/1996 | Lee | |
| 5,581,996 A * | 12/1996 | Koch et al. | ............ 60/782 |
| 5,611,197 A | 3/1997 | Bunker | |
| 5,782,076 A * | 7/1998 | Huber et al. | ............ 60/782 |
| 5,839,271 A | 11/1998 | Illbruck | |
| 6,065,282 A * | 5/2000 | Fukue et al. | ............ 60/806 |
| 6,253,554 B1 * | 7/2001 | Kobayashi et al. | ........... 60/806 |
| 6,305,155 B1 * | 10/2001 | Gross | ............ 60/806 |

FOREIGN PATENT DOCUMENTS

| | | |
|---|---|---|
| DE | 197 37 845 C2 | 3/1999 |
| DE | 198 32 767 A1 | 1/2000 |
| EP | 0 392 664 A2 | 10/1990 |
| EP | 0 899 425 | 3/1999 |
| EP | 1 001 136 A2 | 5/2000 |
| EP | 1 149 983 A2 | 10/2001 |
| EP | 1 162 355 A2 | 12/2001 |
| JP | 0906531 * | 3/1997 |
| WO | WO97/38219 A1 | 10/1997 |
| WO | WO98/13584 * | 4/1998 |

* cited by examiner

*Primary Examiner*—Ted Kim
(74) *Attorney, Agent, or Firm*—Buchanan Ingersoll & Rooney PC

(57) ABSTRACT

A gas turbine system comprises a compressor that takes in suction air on the inlet side and compresses it to compressor end air that is available on the outlet side, a combustor in which a fuel is burned by using the compressor end air while resulting in the formation of hot gas, as well as a turbine in which the hot gas is expanded while providing work output. In a method for cooling this gas turbine system, compressed air is removed from the compressor, is fed as cooling air for cooling inside an internal cooling channel through thermally loaded components of the combustor and/or the turbine, is then compressed and added to the compressor end air. An improved cooling without disadvantage for the efficiency of the system is achieved in that, in the manner of a targeted leakage, a small part of the cooling air is fed for film cooling into the turbine stream through drilled film cooling openings provided on the components.

22 Claims, 3 Drawing Sheets

METHOD FOR COOLING A GAS TURBINE SYSTEM AND A GAS TURBINE SYSTEM FOR PERFORMING THIS METHOD

This application claims priority under 35 U.S.C. §§ 119 and/or 365 to application No. 100 27 842.6 filed in Germany on 5 Jun. 2000; the entire content of which is hereby incorporated by reference.

FIELD OF THE INVENTION

This invention relates to gas turbines, and more particularly to methods for cooling a gas turbine and gas turbine systems for performing such methods.

BACKGROUND OF THE INVENTION

In order to cool their hot parts, in particular the combustor and the turbine through which the hot gas flows, existing gas turbines (gas turbine systems) use either cooling media taken from the compressor at a suitable pressure, and which sometimes are further cooled, and which, after they have been used to cool the hot parts, are added to the turbine stream. Such a method and such a gas turbine system are known, for example, from publication U.S. Pat. No. 5,611,197. These existing gas turbines use closed cooling circuits supplied from an external cooling medium source, in most cases water or steam. In the latter case, frequently found in combination power plants, the cooling heat often can be used in the process that follows. Another possibility, described, for example, in EP-A2-0 899 425 of the applicant, combines, especially in the case of blade cooling, a closed steam cooling system in the main part of the blade with an open cooling system in the area of the leading blade edge.

The first category has the disadvantage that the cooling medium, which inherently bypasses heating in the combustor, in most cases undergoes a higher pressure loss in the cooling section than is necessary for the cooling task. In addition, mixing losses are created when the cooling medium enters the main stream. Both represent significant process losses that have an important adverse effect on the efficiency of the process overall.

The second category of externally supplied cooling systems and, in particular, also the third category of the combined cooling systems, does not have these disadvantages or is only affected by them to a limited degree; however, their operation becomes dependent on an external coolant supply, which is associated with an increased level of complexity as well as increased cost and safety risks.

The initially mentioned U.S. Pat. No. 5,611,197 discloses a gas turbine with a closed cooling system for the guide and rotating blades and the hot gas housing of the turbine, in which air with a specific pressure is removed from the compressor at an intermediate pressure level or at the outlet, this air is supplied as cooling air through the components to be cooled, and is then again fed into the compressor at a suitable, lower pressure level. Prior to being fed into the compressor, the returned cooling air hereby also can be additionally cooled inside a cooler.

This known type of closed cooling circuit has significant advantages in terms of simplicity of design and operation and influence on the overall efficiency when compared to the types of cooling described previously in this document. The disadvantage, however, is that, especially with respect to the turbine blades, a film cooling of the component surfaces exposed to the hot gas is not easily possible with this hermetically sealed cooling circuit. This means that a film cooling either must be eliminated—which reduces the load bearing capacity of the components and, as a result, the efficiency; or a separate cooling circuit, which again would increase the complexity of the system and thus its susceptibility to trouble, must be provided for the film cooling.

SUMMARY OF THE INVENTION

It is therefore the objective of the invention to disclose a cooling method for a gas turbine as well as a gas turbine system for performing said method that avoids the disadvantages of known methods of gas turbine systems and is characterized, in particular, by a high cooling effectiveness yet simple design and operation and high overall efficiency of the system.

The concept of the invention is to branch off, in the manner of a targeted leakage, a small part of the cooling air at the cooled component, starting from a closed cooling air circuit that includes the compressor, and to discharge this cooling air through corresponding drilled film cooling openings to the outside in order to enable an effective film cooling on the hot gas-loaded external surface of the component without a significant adverse effect on the efficiency.

The thermally loaded components cooled with the cooling air preferably include the walls of the combustor and/or housing parts of the turbine and/or rotor parts of the turbine and/or blades of the turbine.

A preferred embodiment of the method according to the invention is characterized in that the blades of the turbine are cooled with the cooling air, and that the drilled film cooling openings are located at the leading blade edges and/or the trailing blade edges. In this way, the especially strongly loaded edges of the blades are cooled effectively with a smaller loss of cooling air.

The method becomes especially simple when, according to another embodiment, the turbine comprises a plurality of rows of blades, and the cooling air consecutively flows through these rows of blades.

During the cooling process, the cooling air undergoes a pressure loss that must be compensated by compression before the cooling air is returned. This can be accomplished in an especially simple manner, if, according to another embodiment of the method according to the invention, the compressor of the gas turbine system itself is used for compressing the cooling air after the cooling process, i.e., when the cooling air is fed into the compressor at an intermediate pressure level.

Alternatively, an external compressor also can be used for compressing the cooling air after the cooling process. If the cooling air in this case is compressed with the external compressor until it reaches the pressure of the compressor end air, the compressed cooling air can be added directly to the compressor end air.

It is preferred that the cooling air is cooled after the cooling processing and prior to the compression. By mixing it with the remaining compressor air, this, in particular, makes it possible to reduce the compressor end temperature. This permits an increase in the pressure ratio and therefore of the efficiency.

A cooler can be used to cool the cooling air. It would also be conceivable, however, to inject water directly into the cooling air in order to cool the cooling air. It is also possible to cool the cooling air with a heat exchanger using compressor end air, whereby the cooling air preferably is cooled still further with another cooling medium after it has passed through the heat exchanger.

A preferred embodiment of the gas turbine system according to the invention is characterized in that the second cooling lines merge into the compressor at an intermediate pressure level. Alternatively, an external compressor can be arranged in the second cooling lines, whereby the second cooling lines merge into the outlet of the compressor of the gas turbine system.

Another preferred embodiment is characterized in that a cooler is arranged in the second cooling lines.

BRIEF DESCRIPTION OF THE DRAWINGS

The invention will be described below in reference to the drawings, in which.

DESCRIPTION OF THE INVENTION

Figure 1:
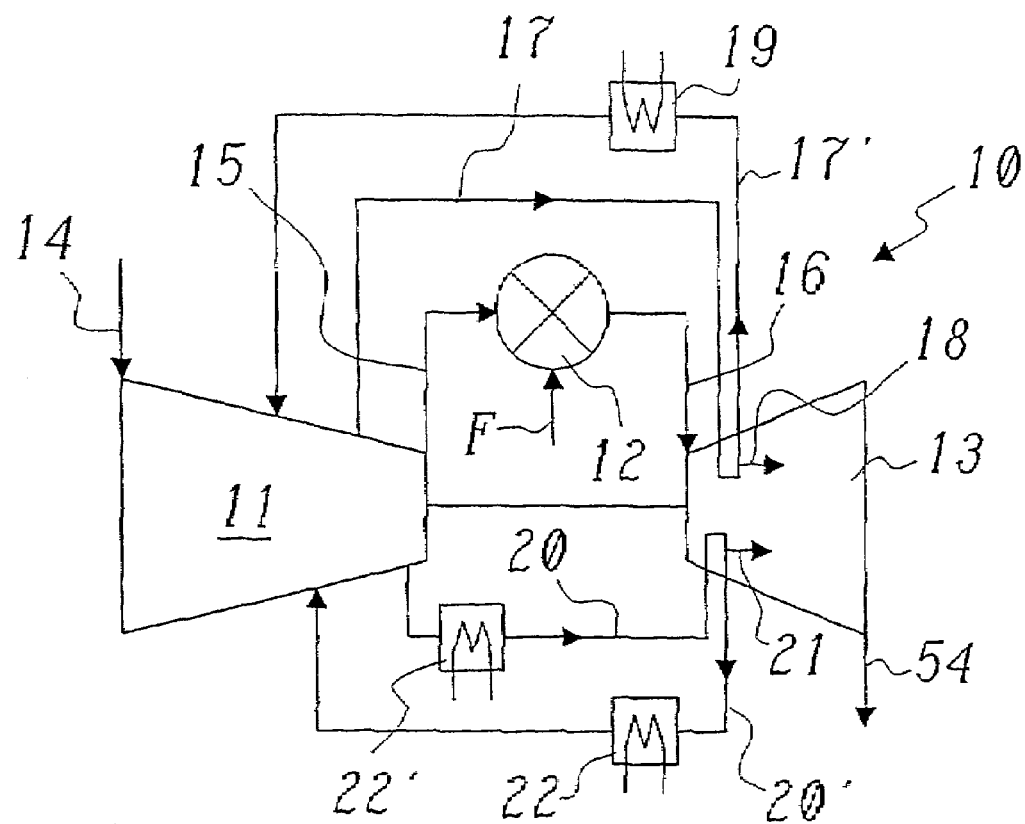
FIG. 1 is a schematic diagram of a gas turbine system according to a first embodiment of the invention.

FIG. 1 shows a greatly simplified system schematic of a gas turbine system according to a first embodiment of the invention with two alternative cooling circuits. The gas turbine system 10 comprises a (usually multi-stage) compressor 11, a combustor 12, and a (usually multi-stage) turbine 13. Compressor 11 and turbine 13 are provided with corresponding rows of blades arranged on a common rotor. The compressor 11 takes in suction air 14 on the inlet side, compresses it, and outputs it on the outlet side in the form of compressor end air 15 to the combustor 12, where it is used as combustion air for burning a (liquid or gaseous) fuel F. The hot gas 16 created during combustion is expanded in the downstream turbine 13 while providing work output, and is then passed on in the form of waste gas 54 to a chimney or—in a combination power plant—to downstream waste heat steam generator.

Inside the turbine 13 are provided—surrounded by a hot gas housing—various rows of guide and rotating blades that are exposed to the hot gas 16 coming from the combustor 12, whereby the closer the blades and housing parts or walls of the transition pieces are located to the inlet of the turbine 13, the greater the thermal load on said blades and housing parts or walls. Given the high hot gas temperatures required for good efficiency, these thermally severely loaded components must be cooled in order to achieve a sufficient life span.

According to the invention, the thermally loaded components are then cooled with cooling air removed from the compressor 11 at a predetermined pressure level, are fed via a first cooling line 17 or 20 to the component to be cooled, are used for cooling there, and are then returned for the most part via a second cooling line 17' or 20' to the compressor 11 and fed into it again at a lower pressure level. This type of return makes it possible for the compressor 11 to compensate for the pressure loss created during the cooling process. The cooling air, therefore, for the most part, takes part in the combustion process as combustion air and therefore results only in small efficiency losses. The cooling of the thermally loaded components is primarily an internal cooling, whereby the cooling air flows through cooling channels inside the components. This results in a substantially closed cooling circuit.

In contrast to the closest state of the art (see initially mentioned U.S. Pat. No. 5,611,197), the cooling circuit is, however, not completely closed, but provides for an additional external cooling in the form of a film cooling. For this purpose, outflow openings (drilled film cooling openings) are provided on the component to be cooled, through which openings a small part of the circulating cooling air flows to the outside in the form of leakage air 18 or 21 and forms a cooling film on the hot gas-loaded external surface of the component. The content of leakage air 18, 21 is hereby selected so that on the one hand the overall efficiency of the system is only slightly reduced, while on the other hand an effective film cooling is achieved.

FIG. 1 shows two such cooling circuits (17, 17', 18, and 20, 20', 21) that—as needed—remove and return cooling air at different pressure levels of the compressor 11. The leakage air 18 or 21 that flows into the turbine flow and therefore cannot be passed through the combustor 12 any longer is symbolized in FIG. 1 by small arrows extending from the cooling circuit outward. The heat absorbed by the cooling air during the cooling process then can be removed again from the cooling air before it is returned into the compressor 11 by providing a cooler 19 or 22 in each of the second cooling lines 17' or 20'. A possible cooling medium in the coolers 19, 22 hereby is, for example, water or steam. But in addition to or in place of this recooling, it would just as well be possible to cool the compressed air after removal from the compressor 11—for example with a cooler 22'—to a lower temperature before it is used to cool thermally loaded components.

The recooling of the cooling air using the coolers 19, 22 at the same time can be used to reduce the temperature of the air compressed in the compressor 11 in the manner of an intermediate cooler. If the cooling air in the coolers 19, 22 is recooled significantly more than would correspond to the heat uptake during the cooling process, the compressor end temperature, i.e., the temperature of the compressor end air 15 can be lowered, which enables an increase in the pressure ratio and therefore an increase in the efficiency.

Figure 2:
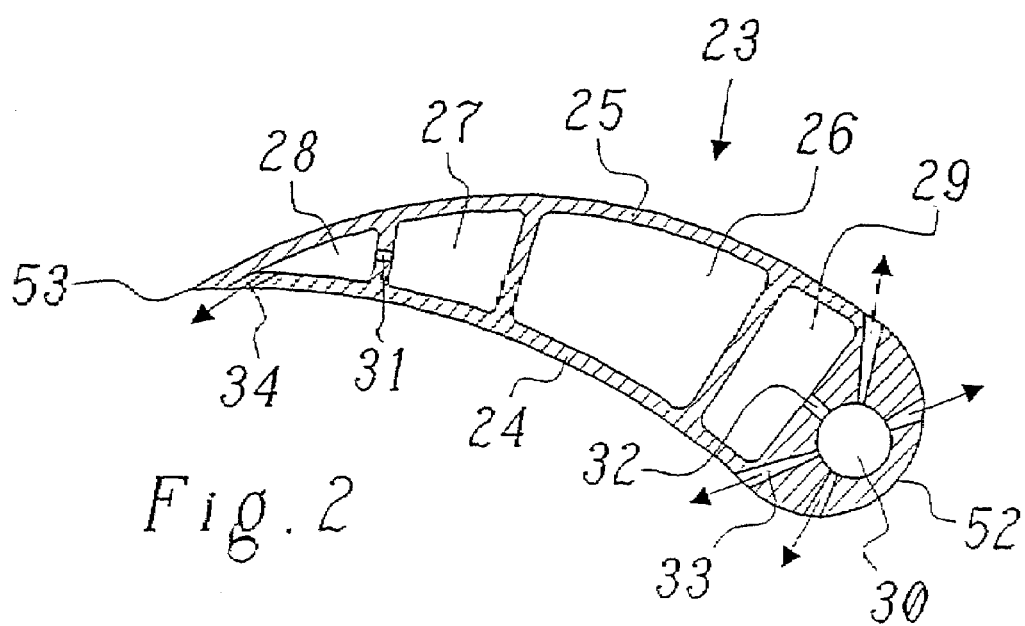
FIG. 2 is a cross-sectional of a blade with film cooling at the leading blade edge and trailing blade edge.

If the component to be cooled is a blade or row of blades of the turbine 13, the leakage air is preferably used to cool the leading blade edges and/or trailing blade edges of the blade(s) by film cooling. A cross-section of an exemplary blade 23 suitable for this purpose is shown in FIG. 2. The blade 23 has a pressure-side blade wall 24 and a suction-side blade wall 25 that both merge at the leading blade edge 52 and the trailing blade edge 53. Inside the blade 23—separated by support walls from each other—various cooling channels 26, . . . , 30 that extend in axial direction of the blade 23 (i.e., vertical to the drawing plane) are provided; the cooling air flows through these cooling channels in alternating direction (see, for example, EP-A2-0 899 425). From the cooling channels 28 and 30 located in the area of the edges 52, 53, drilled film cooling openings 33 or 34, through which the leakage air is able to flow out and form a cooling film on the outside, extend towards the outside (also see, for example, U.S. Pat. No. 5,498,133). The cooling channels 28, 30 are hereby supplied with cooling air from the adjoining cooling channels 27, 29 via connecting channels 31, 32.

Figure 3:
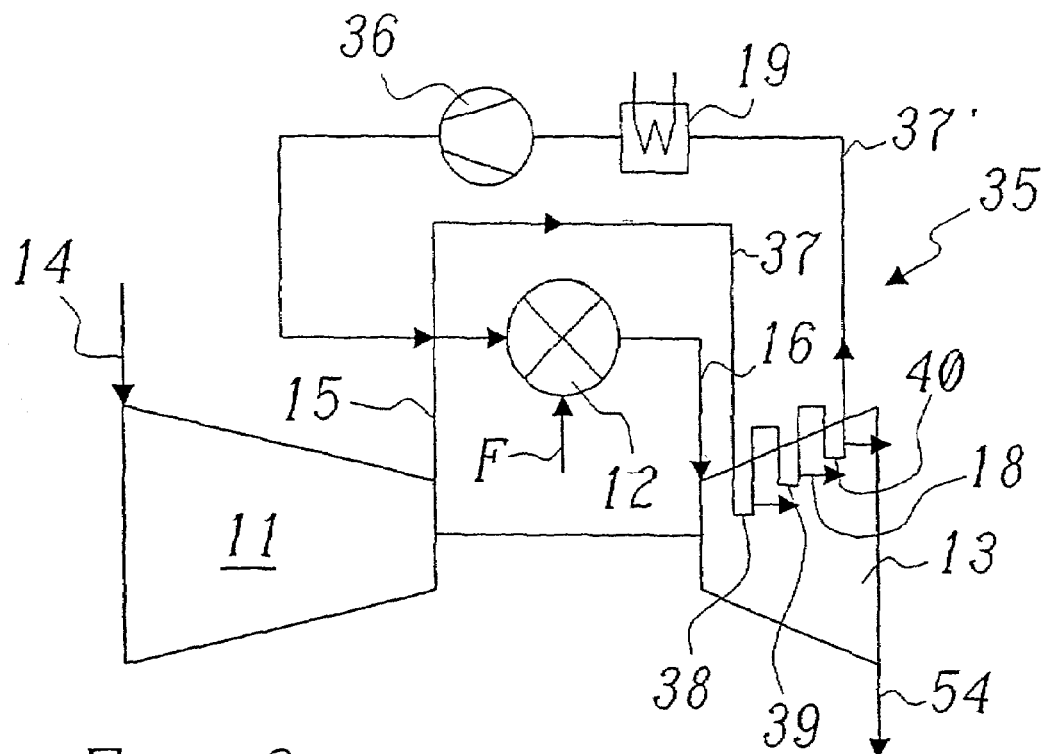
FIG. 3 is a schematic diagram of a second embodiment of the invention.

Based on the basic schematic of the cooling system according to the invention as shown in FIG. 1, different variations that are adapted to different applications and thus have specific advantages can be realized. In the exemplary embodiment of a gas turbine system 35 shown in FIG. 3, two of these variations are realized. On the one hand, the cooling air in the shown cooling circuit, which is formed by cooling lines 37 and 37', can be branched off directly from the compressor end air 15 and is then returned again to the compressor end air 15. The necessary recompression therefore is not performed in the compressor 11 of the gas turbine system 35 but with an external compressor 36. Here also a recooler 19 is provided for recooling prior to recompression. The cooling circuit in this example is not used for a single row of blades of the turbine 13 but for several rows of blades 38, 39, and 40 through which the cooling air flows sequentially. In each of the rows of blades 38, . . . , 40, leakage air appropriately flows into the main stream of the turbine 13 for film-cooling the edges.

Figure 4:
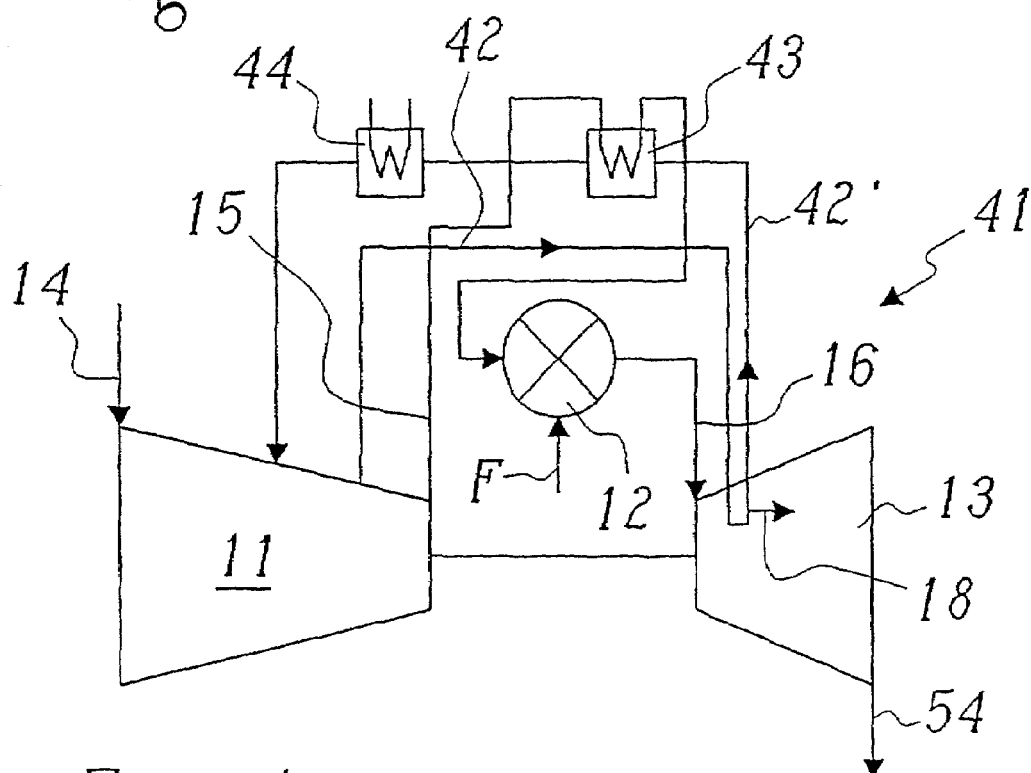
FIG. 4 is a schematic diagram of a third embodiment of the invention.

FIG. 4 shows another embodiment of the cooling system according to the invention. The cooling circuit of the gas turbine system 41, which here comprises the cooling lines 42 and 42' and cools one (or several) row(s) of blades of the turbine (13), directly uses the compressor end air 15 for recooling the cooling air heated during the cooling process. For this purpose, a heat exchanger 43, through which the cooling air and the compressor end air 15 flows (in countercurrent direction), is inserted into the second cooling line 42'. If this first recooling in the heat exchanger 43 is not sufficient, an additional cooler 44 that uses, for example, water or steam as a cooling medium, can be placed downstream.

Figure 5:
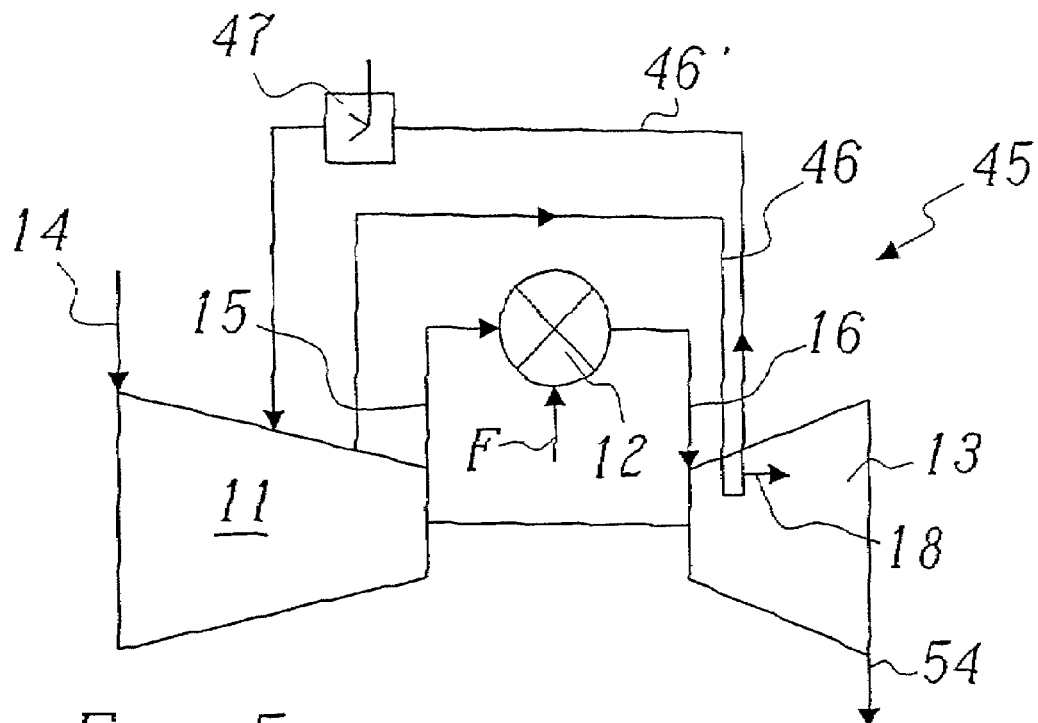
FIG. 5 is a schematic diagram of a fourth embodiment of the invention.

Another possibility for recooling is shown in the embodiment in FIG. 5. In the gas turbine system 45 of this figure, an injection device 47 is inserted into the cooling circuit with the cooling lines 46, 46'. Analogously to a "quench cooling", water is injected here into the cooling air. The temperature reduction of the cooling air that can be achieved with this is preferably designed so that the temperature of the mixed gas is reduced after the recooled cooling air is mixed with the main air flowing through the compressor 11. As already mentioned above, this makes it possible to increase the system's efficiency.

Figure 6:
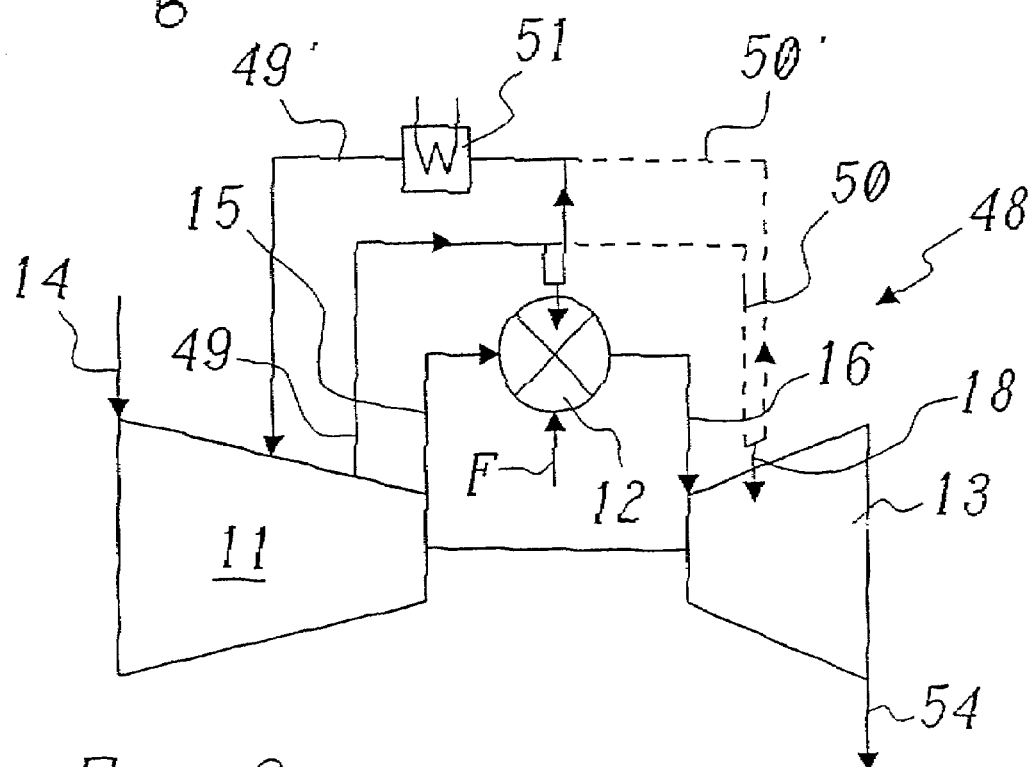
FIG. 6 is a schematic diagram of a fifth embodiment of the invention.

Finally, according to FIG. 6, it is possible within the scope of this invention that in a gas turbine system 48 instead of or in addition to the blades of the turbine 13 other components of the system with high thermal loads are cooled with air in the closed circuit. In FIG. 6, for example, the cooling circuit with cooling lines 49, 49' and cooler 51 is designed for cooling the walls of the combustion chamber 12 or the combustion chamber liners by way of an internal cooling air circulation and external film cooling. Another cooling circuit (drawn with broken lines) with cooling lines 50, 50' ensures an internal and external cooling of the hot gas housing of the turbine 13, in particular in the inlet area of the hot gasses.

Overall, the invention provides an effective cooling of the thermally loaded components of a gas turbine system, which is simple in its design and operation, can be used flexibly, and has only minor effects on the overall efficiency of the system.

What is claimed is:

1. A method for cooling a gas turbine system comprising a compressor that takes in suction air on the inlet side and compresses it to compressor end air that is available on the outlet side, a combustor in which a fuel is burned by using the compressor end air while resulting in the formation of hot gas, as well as a turbine in which the hot gas is expanded while providing work output, the method comprising:

removing compressed air from the compressor;
cooling the removed air;
feeding the cooled removed air through thermally loaded components of the combustor and/or the turbine inside an internal cooling channel;
cooling the air after it has passed the thermally loaded components;
compressing and adding the air to the compressor end air;
wherein, in the manner of a targeted leakage, a small portion of the removed air is fed for film cooling into the turbine stream through drilled cooling openings provided on the components; and
removing more heat from the air in the cooling steps than is transferred into the air while flowing through the thermally loaded components to an extent as to lower the temperature of the compressor end air below that without adding the removed air.

2. Method as claimed in claim 1, wherein the thermally loaded components include the walls of the combustor and/or walls of the transition pieces and/or housing parts of the turbine and/or rotor parts of the turbine and/or blades of the turbine.

3. Method as claimed in claim 2, wherein the blades of the turbine are cooled with the cooling air, and drilled film cooling openings are located on the leading blade edges and/or the trailing blade edges.

4. Method as claimed in claim 1, wherein the compressor of the gas turbine system itself is used for compressing the cooling air after the cooling process.

5. Method as claimed in claim 1, wherein a cooler is used to cool the cooling air.

6. The method of claim 1, comprising cooling thermally loaded components of the combustor and/or the turbine, first cooling lines from the compressor and second cooling lines from the components back to the compressor are provided, wherein a cooler is located in the second cooling lines and wherein the components to be cooled are provided with drilled film cooling openings that communicate with the first and second cooling lines, wherein means for cooling the cooling air are located in the first cooling lines.

7. The method of claim 6, wherein the components to be cooled include blades of the turbine, and the drilled film cooling openings are located on the leading blade edges and/or the trailing blade edges.

8. The method of claim 6, wherein the second cooling lines merge into the compressor at an intermediate pressure level.

9. The method of claim 6, wherein the gas turbine system comprises a cooler located in the first cooling lines.

10. A method for cooling a gas turbine system comprising a compressor that takes in suction air on the inlet side and compresses it to compressor end air that is available on the outlet side, a combustor in which a fuel is burned by using the compressor end air while resulting in the formation of hot gas, as well as a turbine in which the hot gas is expanded while providing work output, the method comprising:

removing compressed air from the compressor;
cooling the removed air;
feeding the cooled removed air through thermally loaded components of the combustor and/or the turbine inside an internal cooling channel;
cooling the air after it has passed the thermally loaded components;
compressing and adding the air to the compressor end air;
wherein, in the manner of a targeted leakage, a small portion of the removed air is fed for film cooling into the turbine stream through film cooling openings; and removing more heat from the air in the cooling steps than is transferred into the air while flowing through the thermally loaded components to an extent as to lower the temperature of the compressor end air below that without adding the removed air.

11. The method of claim 10, comprising cooling thermally loaded components of the combustor and/or the turbine using first cooling lines from the compressor and second cooling lines from the components back to the compressor, wherein a cooler is located in the second cooling lines and wherein the combustor and/or turbine are provided with film cooling openings that communicate with the first and second cooling lines, wherein means for cooling the cooling air are located in the first cooling lines.

12. The method of claim 11, wherein the components include blades of the turbine, and drilled film cooling openings are located on the leading blade edges and/or the trailing blade edges.

13. The method of claim 11, wherein the second cooling lines merge into the compressor at an intermediate pressure level.

14. The method of claim 11, wherein the gas turbine system comprises a cooler located in the first cooling lines.

15. The method as claimed in claim 10, wherein the thermally loaded components include the walls of the combustor and/or walls of the transition pieces and/or housing parts of the turbine and/or rotor parts of the turbine and/or blades of the turbine.

16. The method as claimed in claim 15, wherein the blades of the turbine are cooled with the cooling air, and drilled film cooling openings are located on the leading blade edges and/or the trailing blade edges.

17. The method as claimed in claim 10, wherein the compressor of the gas turbine system itself is used for compressing the cooling air after the cooling process.

18. The method as claimed in claim 10, wherein a cooler is used to cool the cooling air.

19. The method of claim 10, comprising cooling thermally loaded components of the combustor and/or the turbine using first cooling lines from the compressor and second cooling lines from the components back to the compressor, wherein a cooler is located in the second cooling lines and wherein the components to be cooled are provided with drilled film cooling openings that communicate with the first and second cooling lines, wherein means for cooling the cooling air are located in the first cooling lines.

20. The method of claim 19, wherein the components include blades of the turbine, and drilled film cooling openings are located on the leading blade edges and/or the trailing blade edges.

21. The method of claim 19, wherein the second cooling lines merge into the compressor at an intermediate pressure level.

22. The method of claim 19, wherein the gas turbine system comprises a cooler located in the first cooling lines.

* * * * *